E. S. HALSEY.
INDIVIDUAL THERMOSTATIC CONTROLLER FOR RADIATORS.
APPLICATION FILED JULY 21, 1914.

1,204,386.

Patented Nov. 7, 1916.
4 SHEETS—SHEET 1.

WITNESSES
J. P. J. Green
Howard J. Kelly

INVENTOR
Edward S. Halsey

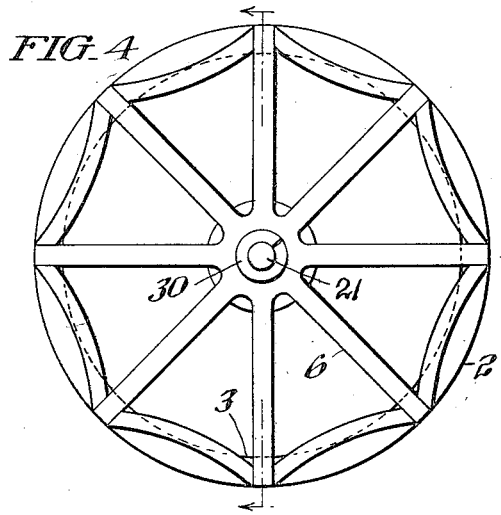
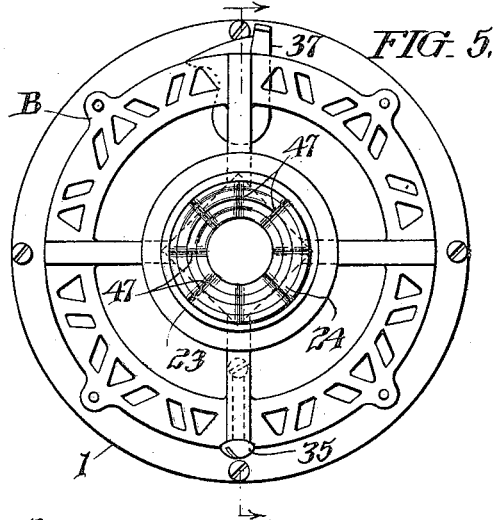
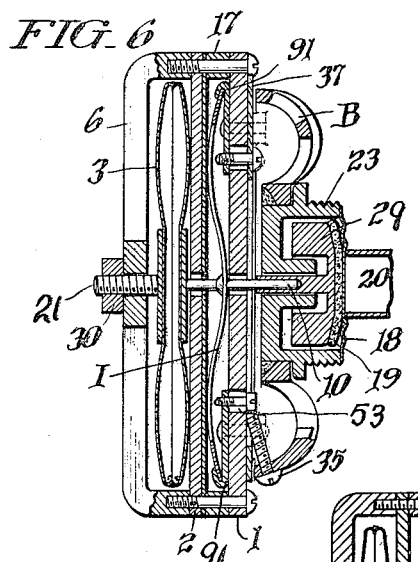
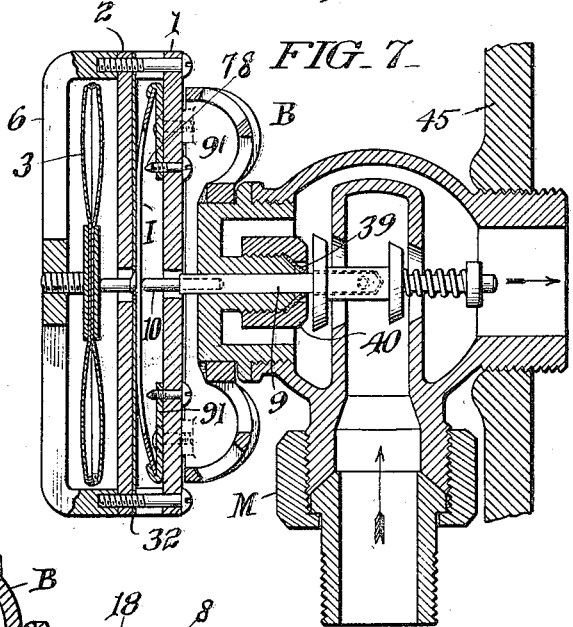
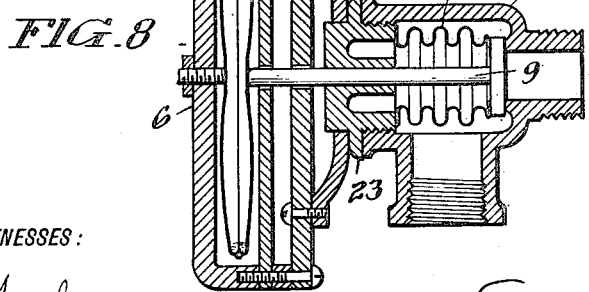

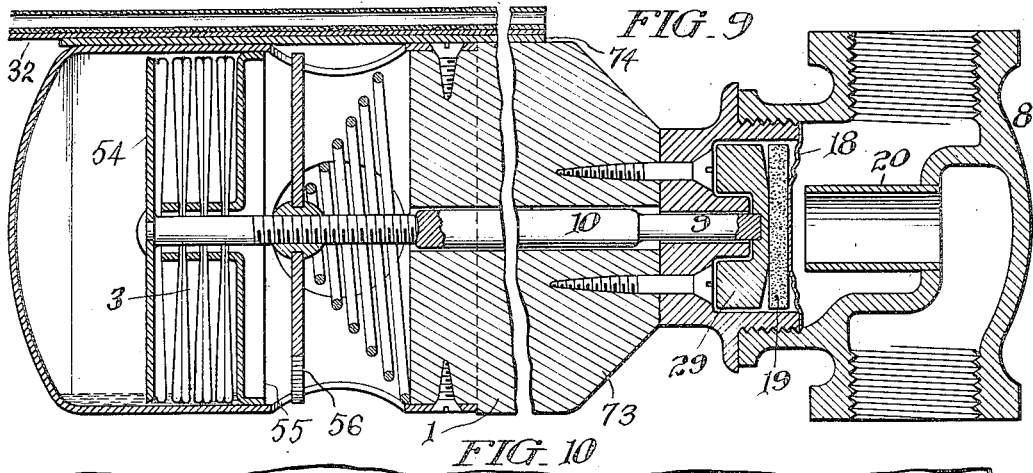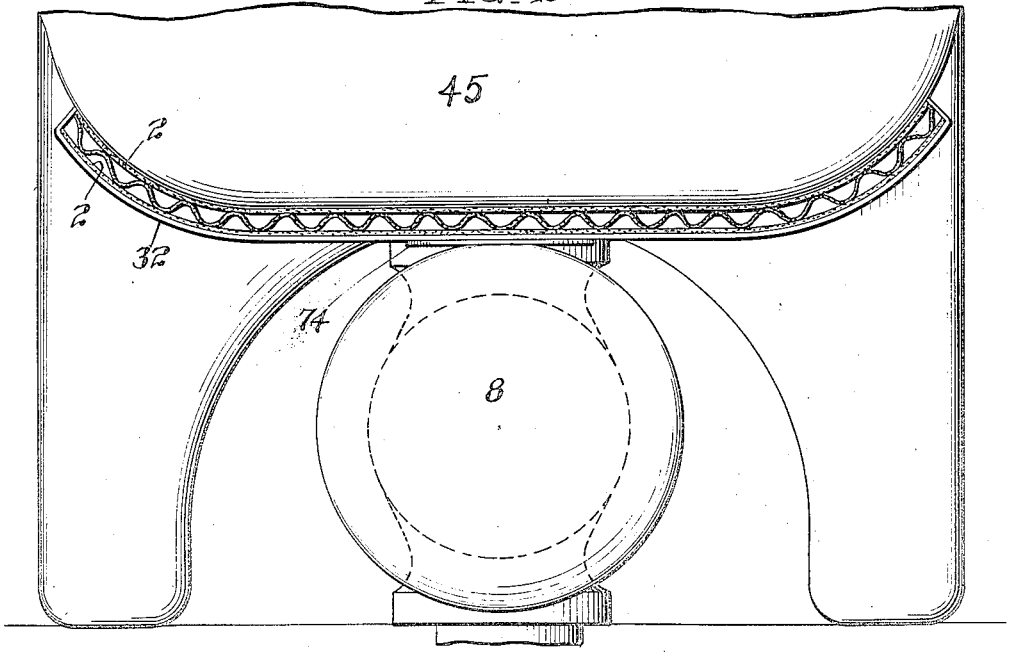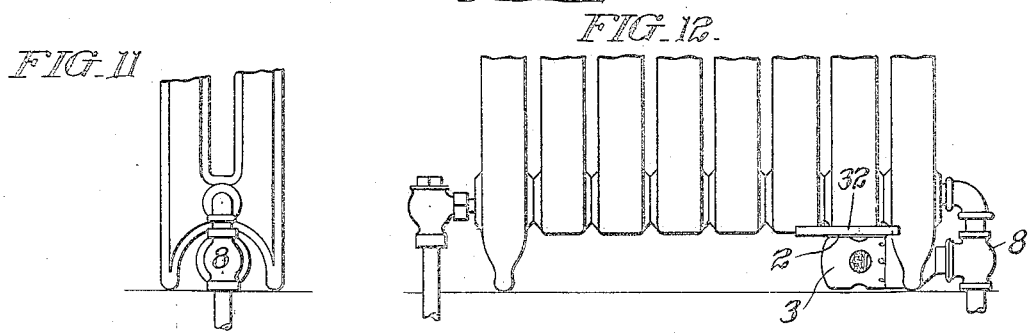

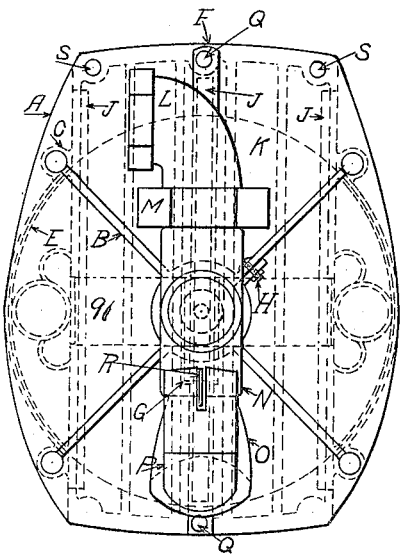
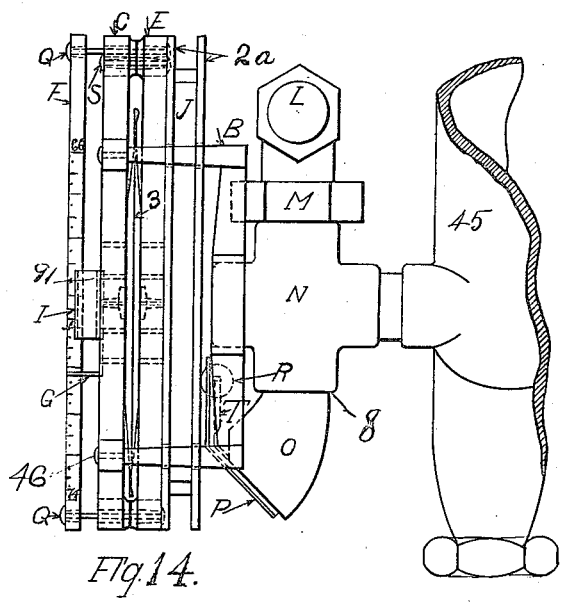
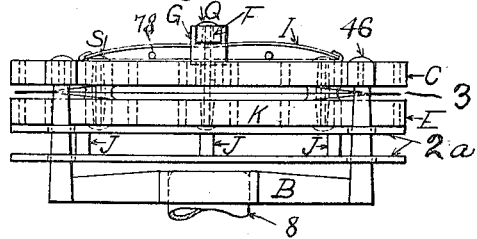
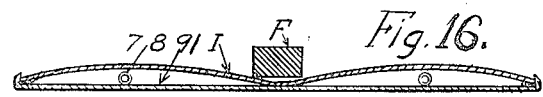
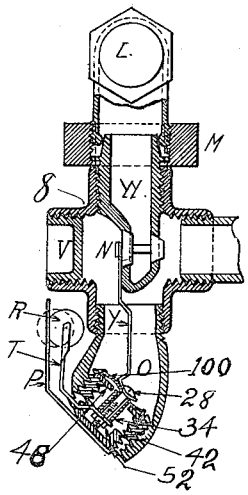
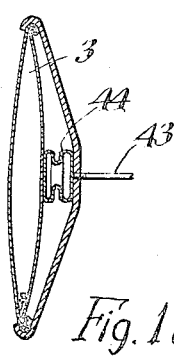
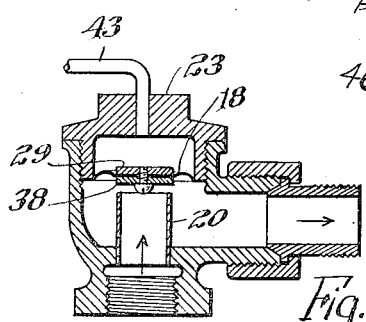

UNITED STATES PATENT OFFICE.

EDWARD S. HALSEY, OF PHILADELPHIA, PENNSYLVANIA.

INDIVIDUAL THERMOSTATIC CONTROLLER FOR RADIATORS.

1,204,386.

Specification of Letters Patent.

Patented Nov. 7, 1916.

Application filed July 21, 1914. Serial No. 852,160.

*To all whom it may concern:*

Be it known that I, EDWARD S. HALSEY, a citizen of the United States, and resident of Philadelphia, in the county of Philadelphia and State of Pennsylvania, have invented certain new and useful Improvements in Individual Thermostatic Controllers for Radiators, set forth in the following specification and claims.

My present invention relates to steam heating systems and comprises essentially a means of regulation by which a constant pressure of steam is maintained at all times throughout the flow mains of the system and each radiator is individually equipped with a direct acting atmospherically influenced thermostatic supply valve of which the thermostat absorbs the energy directly from the room temperature, which it expends individually on its respective valve in a gradual and positive manner, thereby throttling and limiting the steam fed to the radiator to the proper amount to hold the room temperature constantly at a normal, pre-determined temperature.

Said invention and this application have particular bearing on an integral thermic valve couple in which a suitable thermic cell is built directly onto and efficiently insulated from the body of the radiator supply valve so that such couple may be installed as a unit.

The object of said invention is to supply a practical, economical and conveniently installed thermic supply valve of a compact and sightly appearance, providing a packless throttle connection which will be absolutely tight and of negligible mechanical resistance, and efficient means for insulating and shielding said thermic element from the hot valve and its heated connections including the radiator, when the radiator is sufficiently near to require it, and further, to provide suitable means of adjusting the thermic element to regulate the effective temperature at which said thermostat is required to act on said valve.

In the accompanying drawings which illustrate my invention similar numerals and letters refer to similar parts throughout the several views, in which—

Figure 1:
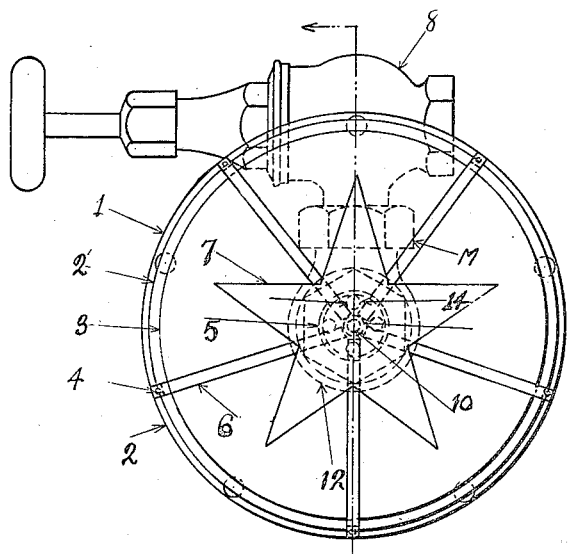
Figure 2:
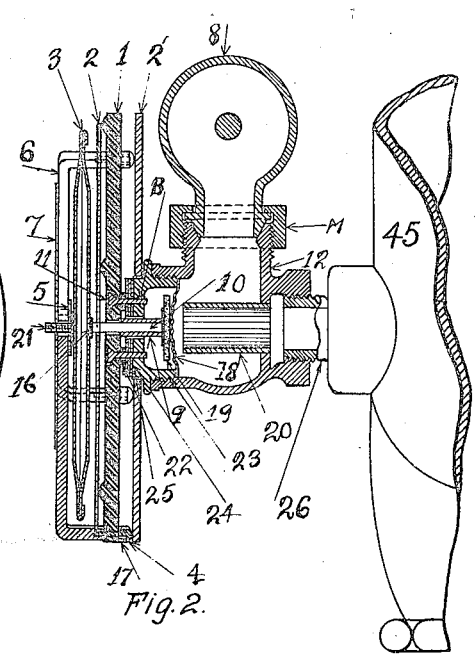

Figure 1., is a front elevation of my Star pattern of thermic valves, which as a class I have entitled "radiostats." Fig. 2, is a vertical cross-section through the center, showing a fragment of radiator attached.

Figure 3:
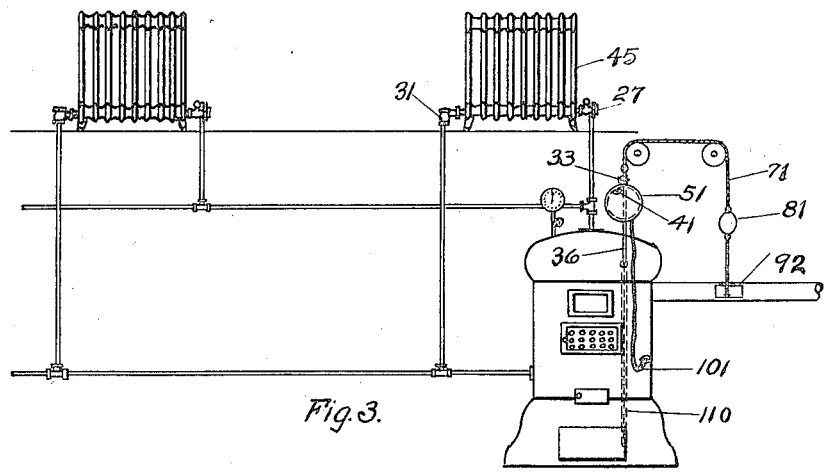

Fig. 3., is a diagram of the system including a steam boiler as a source of supply with sensitive pressure regulator, also radiators with radiostats attached thereto. Figs. 4. and 5., are respectively front and rear elevations of my preferred form of radiostat unscrewed from the body of the valve. Fig. 6., is a vertical cross-section of same through a central line. Figs. 7. and 8. are modifications thereof. Fig. 9., is a central longitudinal cross-section through a cylindrical modification of my radiostat, adapted to fit underneath a standard sectional radiator. Fig. 10., is an end view at the cylindrical thermic cell while in position, looking out from beneath the radiator. Figs. 9. and 10., are about actual size. Figs. 11. and 12. are respectively an end and side elevation on a reduced scale of the lower portion of a sectional radiator with the radiostat connected and in position. Figs. 13. and 14. are respectively, a rear and side elevation of modified form of my radiostat, Fig. 14., showing a fragment of radiator attached. Fig. 15, is a bottom view of same with the valve body, 8., broken off. Fig. 16., is an enlarged sectional view of the special adjusting spring of same. Fig. 17., is a vertical section of the valve body, 8., shown in Fig. 14. Figs. 18. and 19., are respectively a detached thermostatic mechanism and a packless supply valve to be actuated by same through the pipe connection, 43.

Having described the drawings briefly, a more perfect understanding of my invention may be had from the following detailed description of its construction and operation.

In the various types of radiostats shown in the first two sheets of drawings the thermostatic expansion cell, 3, in each case is constituted by a pair of suitably formed flexible metal diaphragms sealed about their periphery. This is attached to and supported by a threaded stem, 21, which in turn is fitted to a concentric threaded hole in the skeleton cage, 6. Said cage is secured to a composite heat shield by a set of screws arranged about its periphery threaded into four or more of the legs of said cage. Said heat shield is constituted by two or more vertically disposed disks somewhat larger in diameter than the thermostat itself. One of said disks, (1), is preferably made of a strong non-conducting material, such as so-called asbestos-wood, which is spaced from the other disks to permit a free circulation of air between them. In my preferred forms, disk, 2, is made of heavy card board and disk, 32, of metal, for which tin plate will answer as it holds its bright surface to reflect heat rays a long time, especially on the side protected by the card board. It performs the further function of distributing and diffusing the heat from concentrated points where it penetrates the rear heat shield through the metallic fastenings. The main heat shield, 1, is spaced from the valve bonnet, 23, and fixed to it by a cast iron spider of thin circuitous connecting arms terminating at four points equally distributed about the periphery of the heat shield where it is clamped by screws tapped into the terminals of said spider, B. This connecting point is purposely widely separated from the points where the thermostat supporting frame, 6, are connected, whereby to make negligible the heat conduction between said points through said insulating disks. This skeleton spider, B, is strongly joined to the square headed bonnet, 23, by having a square orifice through it fitting loosely over the head of the bonnet like a socket wrench, by means of which the entire working parts of the mechanism may be screwed with the bonnet in or out of the valve by using the radiostat as a hand wheel.

The spider is prevented from coming off the square bonnet head by a number of beads of solder adherent to the bonnet and overhanging the spider, leaving the spider loosely but strongly united to it, giving mechanical strength with low conduction of heat. Such heat as is conducted through the four slender heat-resistant arms of the spider is largely dissipated by passing through the circuitous interrupted and well ventilated poorly conducting structure before the four terminal connections or clamping points are reached. Thus practically no heat can arrive by conduction from the valve to the thermostat, although very closely associated. The multiple vertically disposed heat shield effectively arrests and dissipates practically all radiated heat from the closely associated valve and its heated connections including the radiator. So that in spite of its position, after numerous experiments, I have succeeded in contriving a construction in which the thermostat is affected only by room temperature. Further, to accomplish this result, I have limited the metallic valve stem, 9, to a position back of the heat shield and made an insulating extension, 10, of a wooden pin driven into a hole in the end of said stem. In the structures shown in Figs. 1. to 6., inclusive, I employ a perfectly steam tight, packless, frictionless connection between the valve stem and the throttle within the valve through the means of a thin, very flexible metal diaphragm, 18. In these figures, the inner surface of this diaphragm itself acts as the throttle by moving toward and seating on the raised tubular seat, 20. In Figs. 8. and 19., however, I have chosen to employ composition disks attached to the inside of said diaphragm. For the sake of simplicity, however, I prefer to use the thin flexible diaphragm directly against the tubular seat backed by the felt cushion disk, 19, and the plunger or compression disk, 29, back of the padded diaphragm to force it onto the seat and insure a perfectly tight seating contact. This throttle diaphragm has concentric and radial corrugations to increase its flexibility and extent of travel, the radial corrugations or grooves materially enhancing these properties, also preventing buckling of the diaphragm, as is more particularly described and claimed in my U. S. patent application for "pipe thermostatic motors" filed, July, 12th., 1909, Serial Number 507070. This diaphragm is soldered to the inner edge of bonnet, 23, or otherwise arranged to make a steam tight partition between the steam cavity in the body of the valve and the compression disk cavity between the diaphragm and the bonnet. I prefer to make this compression disk, 29, in the form of a heavy annular weight to deaden the vibrations of the diaphragm disk by virtue of its inertia, holding the felt pad snugly against the diaphragm.

As a means of increasing the degree of temperature of which the thermostat operates slightly and to neutralize the natural increase of diaphragm resistance which progressively increases with dilation, I have devised a special spring construction which supplies a resistance to the diaphragm expansion of a nearly constant or slightly decreasing tension with progressive compression, contrary to the common law of springs in which the tension invariably increases at a fixed ratio with deflection. I secure this result by the bowed, flat spring, I, shown in Figs. 6. and 7., and with a modified application in Figs. 13., 14., 15., and 16. This spring is restrained from elongation by end pivoting yoke clamps, 91. In Fig. 6., this clamp is made adjustable, being constituted by two end sections or claws slidingly secured in slots, 53, by screws penetrating the asbestos-wood disk, 1. In order to adjust the thermostat to its normal working temperature, when the thermostat is in the desired position, determined by the spring check ring, 30, on the threaded supporting stud, 21, being lodged against the thermostat supporting frame, the adjusting screw, 35, is tightened against the screw holding the lower yoke clip, 91, until the desired working temperature is reached. At any time thereafter the end tension on said adjusting spring may be partially or entirely relieved, thereby lowering the effective working temperature of the thermostat several degrees by swinging out cam, 37, which is pivoted on the retaining screw of the upper yoke clip, 91. In Fig. 6, the thermostat and spring are shown at their maximum deflection with the throttle disk tightly closed against its port, 20.

In Fig. 7., the thermostat is collapsed and the spring at its limit of minimum travel, with the valve wide open. The valve construction shown in this figure is of the bi-port balanced type.

In the modification shown in Fig. 8., instead of having the port seat raised in the form of a tube to meet the disk diaphragm, an accordion bellows form of diaphragm is adapted to extend from the point where it is secured to the bonnet down to the port seat at the other end of the body. This form of diaphragm is much more expensive than the disk form. The spider, B, in this figure is shown simply as a four legged outrigger instead of the composite ring form shown in the preceding figures.

In the cylindrical modification of my composite thermic valve, shown exclusively on the third sheet of drawings, the thermic cell is constituted by an outer cylindrical shell with a closed end. The inner opening of said shell is sealed by a piston plate, 54, flexibly united with a solid diaphragm, 55, by means of a multiple of thin flexible metal diaphragm pairs, 3, of a bellows construction sealed together about their peripheries and to a set of central collars. The thrust of the internal pressure of volatilization is communicated through a concentric threaded piston rod to the wooden piston section, 10, which in turn presses against the metal stem, 9, of the compression disk, 29, which actuates the disk throttle diaphragm through the medium of the felt pad, 19, as previously described.

The operating temperature of the thermostat may be adjusted by means of knurled disk nut, 56, which travels on the piston rod to increase or decrease the tension of the chair spring on the vapor tension within the thermic cell. Access is had to this adjusting wheel through four large perforations in the shell, which perforations also provide free circulation of air to the surfaces within the shell to increase the effective surface exposed to the atmospheric convection. Said shell is supported and insulated from the body of the valve by the wooden cylinder, 73, secured to the bonnet by wood screws. This thermic cell is designed of a proper shape and size to go beneath a standard cast iron radiator, from which it may be insulated by two paste board sheets, 2 and 2 with an intervening air space and an outer protection of heavy tin plate, 32, to hold it in position, reflect radiation and dissipate or diffuse any transmitted heat. To support and to further insulate the thermic cell from the radiator and shield, I wedge another sheet of insulating board, 74, between the thermic cell and the tin plate, 32. I preferably attach the entire working mechanism to the bonnet, as shown in the preceding figures, so that they may be readily detached for ready inspection or repairs and to enhance the safety and convenience of installation. I have provided however a means by which the entire thermostatic mechanism, which is of necessity more or less delicate, may be readily separated or attached to the valve body in the modification shown in Figs. 13., 14., and 15. In this modification which is radically different from the preceding, the thermic expansion disk, 3, which like the preceding contains a small quantity of volatile liquid, is clamped and restrained between a pair of hinged cast iron grid plates, C and E, which are pivoted or hinged together by loose fitting rivets, S and S, at the top corners, which permit the bottom extremities of the grids to swing freely apart an eighth of an inch or more. The front grid is supported by being fixed to a slender cast iron spider, B, by four screws, 46, tapped into the four extremities of the out-riggers constituting said spider. Said out-riggers are centrally united in a central split ring or band which is clamped around the cylindrical outer extremity or branch of the cross-T, (N), which forms the trunk of the valve body, 8. This split collar is clamped to said body by means of the contracting screw, H. Being supported thus the thermostatic expansion forces back the rear or swinging grid, E, which carries a duplex air spaced heat shield constituted by insulating plates, 2ª—2ª, which are joined by three vertical insulating liners, J—J—J, which are screwed to said grid. This heat shield swinging as a unit with said grid presses against anti-friction wheel, R, pivoted in the extremity of lever, T, which is united to an inner reversed branch, Y, thereof. This lever arrangement is pivoted or hinged by and on a thin metal diaphragm, 100, which allows a free travel of the lever through a wave motion of the diaphragm which rocks freely under a slight stress, providing a packless, steam tight, frictionless connection between the outer actuating mechanism and the throttle within the valve. The inner and outer sections of the throttle lever are clamped together by the screw, 28. The intervening tubular collar, 34, clamps the diaphragm against the inner section of the lever. The diaphragm is soldered to the threaded collar or bushing, 42, and after all the working parts are in position the guard plate, P, is soldered over the head of said bushing to protect these relatively delicate parts from mechanical injury. The anti-friction wheel, R, is permitted to work freely in and out through a slot in the end of said guard so as to engage with the back of the heat shield which travels with the thermostat grid. Said diaphragm may be given an initial kink toward the open position, wherefore by virtue of its elasticity it will act as an opening spring for the throttle lever. Or other means may be provided for this purpose.

To provide an adjustable compression tension on the thermostat for adjusting and altering the actuating temperature thereof, I have devised the vertical scale bar, F, attached to the back thermostat grid by means of tie rods, Q and Q, which are loosely socketed to permit a slight lateral motion. Between this vertical bar, which swings with the back grid, I have placed the specially constructed spring, I, with its end restraining yoke, 91, and attached forked indicator, G. This indicator straddles the scale bar and slides up and down it with said spring and yoke, to alter the relative position and consequent effective tension of said spring mechanism on the thermostat, proportionate to its distance from the upper hinge of the grids.

The scale bar is ordinarily calibrated with the normal temperature of 70 degrees at the center of the slide, so that when the spring is manually forced to the lowest position the indicator, G, will rest at about 74 degrees. And when it is moved to the uppermost position, it will indicate that the device is adjusted to work at about 66 degrees.

The raised nibs, 78, about one fourth of the distance from either end of the spring, which in Figs. 6. and 7., are constituted by screw points, are provided to prevent either end of the spring from being accidentally bent so far below its normal position as to fail to recover itself.

Fig. 18, is a diagrammatical cross section sketch of a thermostatic expansion cell, 3, of relatively large diameter exerting its force against an elastic cell of very much smaller diameter, (44), which is adapted to be filled with a suitable non-volatile fluid and connected with a valve shown by Fig. 19, through the medium of a hermetically sealed pipe, 43, in which the bonnet chamber above the diaphragm is also fluid filled as well as said connecting pipe. With this arrangement said thermostat may be located a considerable distance from said supply valve and actuate the valve, by its expansion, from a temperature change of less than two degrees. This may be accomplished by virtue of the very much greater effective area of the thermostat in relation to the working area of the fluid pressure cell, resulting in a greater internal pressure developed in said cell and acting upon the diaphragm, 18, of the valve and its attached compression and throttle disks, so that with an internal pressure of, say, one third of a pound within the thermostat, per square inch, it is possible to exert a pressure of three or more pounds per square inch on diaphragm, 18.

It should be understood that in the several modifications herein described where the throttling is accomplished by compression of the diaphragm, from the bonnet or outward side thereof against the steam pressure and seat within the valve, that, upon reverse action when the pressure from without relaxes, the diaphragm is unseated and restored to its former position by the internal steam pressure which is maintained as a constant factor, and also by the natural spring of the very thin diaphragm itself, which is preferably from one to three thousandths of an inch in thickness.

Referring again to Fig. 3., illustrating the complete arrangement of my system, the pressure regulator consists of a damper yoke connecting the lower and pipe dampers over a pair of pulleys having a counterweight, 81, holding the lower draft normally open and provided with a water tank, 51, connected by a flexible hose, 101, below the water line of the boiler. Said tank is provided with an air vent, 41, at the top to permit water from the boiler to enter freely in proportion to the steam pressure, thereby weighting down the front damper and checking the fire in the most sensitive manner upon the slightest excess of pressure above the normal pressure for which the water tank is set.

27 indicates the radiostat connected to radiator, 45.

31, indicates the return trap.

Referring again to Fig. 7., it will be seen, that in this modification, I show instead of the throttle diaphragm as a low friction means of communicating the motion of the thermostat to the throttle, a thin coned fiber washer, 39 (as claimed in my application, #507071, filed July, 12th., 1909.), one sixty fourths of an inch in thickness, which may be made of vulcanized fiber, jute board or similar tough and plastic fiber which may answer the purpose. The hole through the washer is normally slightly less than that of the valve stem passing through it, but on account of its thinness and plastic nature while wet, it allows the rod to slip back and forth freely with a steam tight joint and is tightly secured in position by the nut, 40, clamping it to the cone stud surrounding the stem.

I am aware that considerable effort has been made to devise a successful system such as I herein describe. Also to construct a successful integral, thermic supply valve for said purpose. But I am not aware and do not believe that any such device has ever been constructed or used incorporating the several essential elements which I herein describe and claim.

I claim:—

1. In combination with a heating radiator and the regulating valve thereof, a thermostat mounted on said valve and connected thereto to open and close the same in accordance with the temperature changes, said thermostat being located at one side of the valve out of the path of heated air currents rising from the valve, and a shield repellant to radiant heat arranged between the thermostat and valve, whereby the thermostat is acted upon only by air having substantially the average room temperature and influence of the heated valve is substantially excluded.

2. An individual radiator control comprising in combination a valve body and valve therein, a thermostatic cell, an outrigger or support of ventilated skeleton structure mounting said cell and mounted on the valve body, arranged to hold the cell at one side of the valve out of the path of the heated air currents rising therefrom, operating connections between the cell and valve for opening and closing the latter in response to movements of the former caused by temperature changes, and a shield resistant to radiant heat interposed between the cell and valve body.

3. An individual radiator control comprising in combination a valve body and valve therein, a thermostatic cell, an outrigger or support of ventilated skeleton structure mounting said cell and mounted on the valve body, arranged to hold the cell at one side of the valve out of the path of heated air currents rising therefrom, operating connections including a motion transmitting member of heat-insulating material between the cell and valve for opening and closing the latter in response to movements of the former caused by temperature changes, and a shield resistant to radiant heat interposed between the cell and valve body.

4. In an integral, composite, temperature regulating radiator supply valve, an internally ported valve body; a bonnet closing one side of said valve; a non-heat-conducting out-rigger fixed to said bonnet supporting a sensitive, atmospheric, thermic cell out to one side from said valve and its rising heat currents; an efficient radiant heat shield for said thermic cell carried by said outrigger between the cell and the valve; a throttling disk within said body; and a packless friction eliminating device communicating the closing pressure from said cell to said disk through and by means of a flexible diaphragm 18, hermetically sealed inside of said bonnet.

5. In an intgeral, composite temperature regulating radiator valve, an internally ported valve body; a detachable valve bonnet closing one side of said body; a non-heat-transferring holder carried by said bonnet, a thermostat mounted on said holder out to one side from said valve and its rising heat currents; a throttling valve stem from said bonnet in connection with said thermostat by non-heat-transferring means; and a suitable, efficient radiant-heat-shielding means interposed between said thermostat and the adjacent heat-radiating surfaces.

6. In a composite valve of the class described, a suitable atmospheric thermostat close beside and fixed to the body of said valve by heat resisting means; a non-conducting actuating connection between said thermostat and a throttle within the valve; a vertical heat shield constituted by a multiple of vertical plates one of which at least being of non-metallic material, said shield being interposed between said thermostat and valve for the purpose specified.

7. In a composite valve of the class described, a suitable atmospheric thermostat close beside and fixed to the body of said valve by heat resisting means; a non-conducting actuating connection between said thermostat and a throttle within the valve; a vertical heat shield constituted by a multiple of non-metallic insulating plates spaced from each other with an interlaminated metallic plate, said shield being interposed between said thermostat and valve for the purpose specified.

8. In a composite valve of the class described a body portion; a detachable bonnet forming one side of said body; out-riggers fixed to radiate from said bonnet; a non-conducting heat shield concentrically fixed to said out-riggers, or spider; a thermostat arranged concentrically outside of said shield; and a concentric actuating push stem extending through said shield and bonnet for the purpose specified.

9. In a composite valve of the class described, a valve body; a thermostat attached to one side of said body; a vertical heat shield interposed between said thermostat and body; a detachable bonnet for said body; a thin flexible metal partition so interposed between the cavity of said body and said bonnet as to create a secondary cavity within and between said flexible partition and said bonnet; a throttling disk carried by said partition on the body side thereof and an actuating stem leading from the other side of said partition through the bonnet and heat shield to said thermostat for the purpose specified.

10. In a composite valve of the class described, an atmospheric thermostat fixed close to one side of the body of said valve; a detachable bonnet for said body; an internal cavity in said bonnet; a thin metal diaphragm partitioning said bonnet cavity from the interior cavity of said body; a raised valve seat within said body projecting to the vicinity of said diaphragm; a compression head or disk back of said diaphragm; a cushion pad between said head and disk and a concentric thrust rod leading from said disk to the thermostat, by means of which the diaphragm may be snugly forced to said seat to close said port.

11. In a composite valve of the class described, an atmospheric thermostat constituted of vertically disposed horizontally expanding diaphragms fixed close beside the body of said valve; a heat shield interposed between said thermostat and body; an actuating connection between said thermostat and valve; and a thin skeleton supporting spider concentrically connected to the body of said valve radiating therefrom in a multiple of circuitous branching terminals which engage and support said shield and thermostat.

12. A composite valve of the class described, a valve body; an attached actuating thermostat; an operating connection between said thermostat and a throttle within said valve; a heat shield of suitable insulating material interposed between said body and thermostat and a set of supporting metal out-riggers branching from said body and securing said insulating shield at divergent points; and a thermostat supporting frame on the other side of said shield secured to it at a multiple of points effectively separated from the said points to which said supporting out-rigger terminals are connected so as to secure a substantial support through said shield without a material conduction of heat.

13. In a composite valve of the class described, a radiator supply valve; an actuating thermostat connected thereto, consisting of a pair of diaphragms sealed together about their periphery; a heat shield intervening between said thermostat and valve; a valve stem extending from the throttle within the valve to the back of said thermostat; a supporting frame for said thermostat fixed outside of said heat shield and thermostat having a concentric threaded hole; a concentric threaded supporting stem fixed to said thermostat arranged to be screwed back and forth in said threaded hole by means of which the lateral position of said thermostat may be adjusted by revolving the thermostat and stem to alter the actuating temperature thereof.

14. In a composite valve of the class described, a radiator supply valve; an actuating thermostat connected thereto, consisting of a pair of diaphragms sealed together about their periphery; a heat shield intervening between said thermostat and valve; a valve stem extending from the throttle to the back of the thermostat; a supporting frame for said thermostat fixed outside of said heat shield and thermostat having a concentric threaded hole; a concentric threaded supporting stem fixed to said thermostat arranged to travel back and forth in said threaded hole by means of which the position of the thermostat may be adjusted by revolving the thermostat and stem to alter the actuating temperature thereof; and an adjustable check collar for fixing or determining the normal inward position.

15. In a thermostatic temperature regulating mechanism, a sealed thermic cell consisting of a flexible metal disk diaphragm; a heat dominating valve or contact connected to and actuated by said expansion cell; a spring geared to and restraining the expansive movement of said mechanism so constituted and applied as to exert a decreasing resistance to said expansion as the deflection of said diaphragm and spring increases, tending to balance the natural increasing resistance of the diaphragm.

16. In a thermostatic temperature regulating mechanism, a sealed thermic cell having an expansion member consisting of a metal disk diaphragm; a heat dominating valve or contact connecting to and actuated by said expansion cell; a spring geared to and restraining the expansive movement of said mechanism consisting of a bowed flat spring, restrained against elongation and having a central traverse tension of a constant or decreasing degree as it is depressed against its arch for the purpose specified.

17. In a thermostatic temperature regulating mechanism, a sealed thermic cell having an expansion member consisting of a metal disk diaphragm; a heat dominating valve or contact connecting to and actuated by said expansion cell; a spring geared to and restraining the expansive movement of said mechanism consisting of a bowed flat spring, I, restrained against elongation and having a central traverse tension of a constant decreasing degree as it is depressed against its arch; and a means provided for releasing and adjusting the effective tension of said spring on said expansive cell for the purpose specified.

Having described my invention, I hereunto set my hand in the presence of two witnesses this twentieth day of July, 1914.

EDWARD S. HALSEY.

Witnesses:
I. T. TRACEY,
S. C. HALSEY.